H. C. RICE.
STRAINERS, STEEPERS, AND CLARIFIERS FOR TEA, COFFEE, &c.

No. 193,894. Patented Aug. 7, 1877.

ATTEST:
Arthur C. Fraser
William D. Sandray

INVENTOR:
Henry C. Rice
Per Burke & Fraser
Attys.

UNITED STATES PATENT OFFICE.

HENRY C. RICE, OF LOUISIANA, MISSOURI, ASSIGNOR OF ONE-HALF HIS RIGHT TO JOHN G. HACKING.

IMPROVEMENT IN STRAINER, STEEPER, AND CLARIFIER FOR TEA, COFFEE, &c.

Specification forming part of Letters Patent No. 193,894, dated August 7, 1877; application filed March 27, 1877.

*To all whom it may concern:*

Be it known that I, HENRY C. RICE, of Louisiana, in the county of Pike and State of Missouri, have invented certain Improvements in a Strainer, Steeper, and Clarifier for Tea, Coffee, &c., of which the following is a specification:

This invention relates to a device adapted to fit into any ordinary coffee or tea pot, but forming no part of the same.

It consists, essentially, of a perforated or gauze receptacle, usually cylindrical, mounted upon two or more elastic legs, and arranged to be inverted, or used with either end up, as may be required.

It also consists in providing said receptacle with a perforated or gauze lid or cover having a vertical wall or rim to retain the hot water poured upon it, and compel it to pass down through the meshes or perforations.

It consists, further, in providing a receptacle of the character above described, with an internal removable wall, not perforated, and having, approximately, the same form and size as the receptacle, the same being designed to prevent the escape of the inclosed fluid through the perforations or meshes in the walls of the receptacle, but to permit it to pass freely through the openings in the bottom of the same, all as will be hereinafter set forth.

Figure 1:
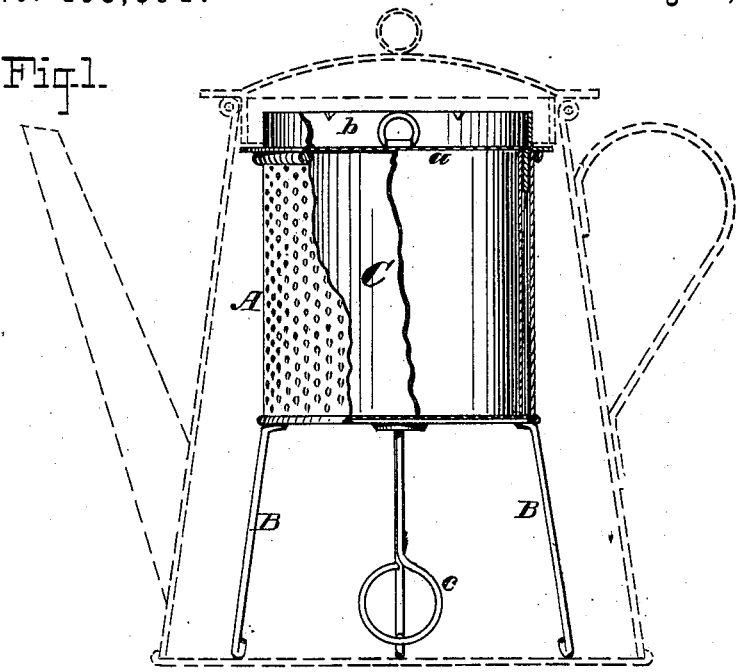
Figure 2:
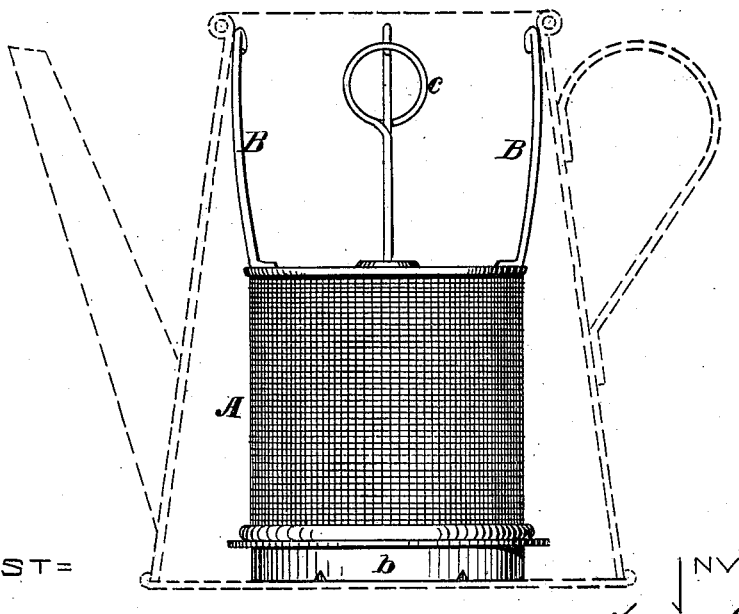

In the drawings, Figure 1 is an elevation, partly broken away, arranged to illustrate the application of my device to steeping coffee or to "drawing" tea. Fig. 2 is also an elevation, which shows the device inverted and adapted to boiling coffee or tea, or any other substance of which a decoction is to be made.

In both figures a containing vessel or pot is indicated in dotted lines, the same forming no part of my invention.

A is a vessel or receptacle, usually cylindrical, to conform to the shape of the ordinary coffee-pot. This vessel is made, preferably, of perforated tin-plate or of gauze, the sides, top, and bottom being of substantially the same material. The top *a* is made removable, as the lid of the pot, and is provided with a rim or wall, *b*.

To the bottom of the receptacle are rigidly affixed two or more elastic legs, B B, and a lifting-handle, *c*. C is a loose, removable cylinder, preferably constructed of imperforated tin-plate, which may be made just long enough to fit snugly between the bottom and cover of the receptacle, and be of just the proper diameter to drop snugly therein.

These proportions, however, need not be rigidly adhered to. Indeed, I do not consider this cylinder as an essential feature of my device; but in some cases, as will be set forth, I prefer to use it.

When it is desired to steep the coffee, as in a "drip-pot," the device is set upon its feet in the pot, as in Fig. 1, the coffee placed in the receptacle A, and the lid placed thereon. Boiling water is now poured slowly upon the lid where it is retained by the ledge *b*, and allowed to trickle through the lid onto the coffee within.

If it is desired to attain the fullest strength of the decoction at one passage of the water through the coffee or tea, as the case may be, it is perhaps advisable to use the cylinder C, placed as shown in Fig. 1, which interposes a barrier between the perforated walls of the receptacle and the substance to be steeped, thus compelling the hot water to pass down through the said substance, and out through the perforations in the bottom.

If it is desired to boil the substance from which the decoction is to be made, instead of steeping it, it is first placed in the receptacle A, and the latter is then placed in the pot in an inverted position, as shown in Fig. 2. The elasticity of the legs causes them to spring outwardly against the sides of the pot, and thus hold the receptacle firmly in place; otherwise the buoyancy of the fluid, and the agitation caused by boiling and by handling, would lift it up, and perhaps knock off the cover *a*. When used in this manner the cylinder C is, of course, removed.

By the use of my device I am enabled to make coffee in any of the various ways known in the art of cookery. The ground coffee or the tea is prevented from clogging up the spout in pouring, and from escaping at the spout or over the top of the pot in boiling over.

The receptacle A being large and roomy, the hot water has perfect access to every particle of the coffee or tea used.

A device in the lid of the pot for condensing the aroma may be used in connection with my device quite as well as with any other pot.

Having thus described my invention, I desire to say that I am aware that perforated receptacles to contain the coffee have been used in connection with coffee-pots, and I make no broad claim to this; but

What I do claim is—

1. As a new article of manufacture, the combination of the perforated or gauze receptacle A, the elastic legs B B, and the removable imperforated cylinder C, all arranged in the manner substantially as herein set forth.

2. As an article of manufacture, the perforated receptacle A, having legs B B, and the perforated cover a, having an elevated ledge or rim, b, all combined and arranged as and for the purposes set forth.

In witness whereof I have hereunto signed my name in the presence of two subscribing witnesses.

HENRY C. RICE.

Witnesses:
HENRY CONNETT,
ARTHUR C. FRASER.